United States Patent [19]
Kladiwa

[11] Patent Number: 6,041,691
[45] Date of Patent: Mar. 28, 2000

[54] MULTIPLE WORKING CYLINDER ARRANGEMENT

[75] Inventor: Wolfgang Kladiwa, Huglfing, Germany

[73] Assignee: Hoerbiger Hydraulik GmbH, Schongau, Germany

[21] Appl. No.: 09/196,227

[22] Filed: Nov. 20, 1998

[30] Foreign Application Priority Data

Nov. 20, 1997 [AT] Austria ................................. A1967/97

[51] Int. Cl.[7] .................................................... F15B 11/00
[52] U.S. Cl. ................................................ 91/534; 91/536
[58] Field of Search .............................. 91/508, 536, 534

[56] References Cited

U.S. PATENT DOCUMENTS 3,094,042  6/1963  Diener .................................... 91/536 X
5,622,095  4/1997  Foster ..................................... 91/536 X Primary Examiner—Hoang Nguyen
Attorney, Agent, or Firm—Watson Cole Grindle Watson, P.L.L.C.

[57] ABSTRACT

Two working cylinders are provided, a pressure medium connector being secured to a first cylinder and allowing fluid to flow to and from the first cylinder through the connector. A distributor is connected to the connector and has first and second ports through which pressure medium can flow. The second port is connected to the second cylinder. The first port is connected through the connector to the first working cylinder and is also connected to the second port. The first port is connected to a source of pressure medium and when pressure medium flows to or from the first port, pressure medium also flows through the connector to or from the first working cylinder as well as to or from the second port and the second working cylinder to cause the first and second working cylinders to operate simultaneously. The distributor is detachably secured to the connector by a U-shaped holding clamp the free ends of which extend through holes formed in the distributor and lie within a circumferential groove formed on the connector.

8 Claims, 5 Drawing Sheets

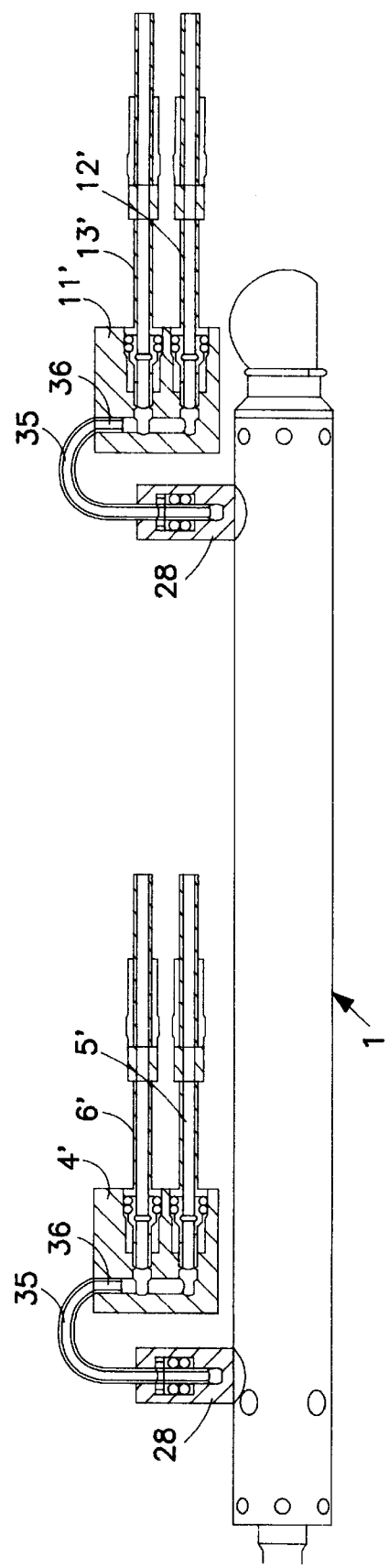

MULTIPLE WORKING CYLINDER ARRANGEMENT

BACKGROUND OF THE INVENTION

1. Field of the Invention

The invention relates to a working cylinder arrangement with at least two cylinders operable simultaneously via the same pressure source.

2. The Prior Art

For very different uses, it is necessary to operate multiple working cylinders simultaneously via the same common pressure source. For this purpose mostly separate pressure supply lines or pressure drain lines have been used and connected to each of the working cylinders. These arrangements are, therefore, very elaborate in their production and in their maintenance and repair, and also require, via the separate lines, relatively much space, or increase the weight of the entire arrangement.

It is the object of the present invention to create a working cylinder arrangement that avoids the above-mentioned disadvantages.

SUMMARY OF THE INVENTION

The object is achieved, according to the invention, in that a pressure medium connector is secured to a first working cylinder, and a distributor is connected to the connector. The distributor has first and second ports, the second port being connected to a second working cylinder. The first port is connected through the connector to the first working cylinder, and is also connected to the second port. When pressure medium flows to or from the first port, pressure medium also flows through the connector to or from the first working cylinder and to or from the second working cylinder to cause the cylinders to operate simultaneously. This arrangement allows for the saving of extensive lengths of pressure lines and is, therefore, smaller, lighter and more simply constructed than conventional arrangements.

According to a further characteristic of the invention, the connector is welded to the outer surface of the first working cylinder. The distributor is detachably secured to the connector, and sealing means provides a fluid tight seal between the connector and the distributor. These characteristics guarantee simple, stable and secure production of a working cylinder with a corresponding connector part. Removal of the distributor part is possible which simplifies the maintenance and replacement of damaged parts. A quick, easily detachable and yet very securely connected arrangement is provided when the distributor is fixed onto the pressure medium connector using a holding clamp.

The holding clamp is advantageously U-shaped, and, when employed, the clamp ends extend through two essentially parallel drill holes in the distributor and extending generally perpendicular to the axis of the distributor, the holes being spaced on opposite sides of the axis so that the clamp ends simultaneously grip into a circumferential groove of the connector. This provides good protection of the holding clamp from outer influences and unintentional disconnection of the distributor as well as supporting the clamp on the distributor.

According to another embodiment, the distributor, spaced at a distance from the pressure medium connector, is fixed to the working cylinder, and a flow line runs between the distributor and the pressure medium connector. This provides greater freedom in the design of the distributor and the manner of fixing the distributor to the working cylinder.

A further space savings or reduction of the structural volume needed for the arrangement can be achieved, if, according to a further characteristic of the invention, the pressure supply line or the pressure drain line of the distributor is oriented essentially parallel to the branched-off distributor connector for the pressure supply line or pressure drain line of at least one of the other working cylinders.

Advantageously, for an even further reduction of the structural volume needed for the arrangement, it is provided that the pressure supply line or pressure drain line of the distributor and preferably also the branched-off distributor connector for the pressure supply line or pressure drain line of at least one of the other working cylinders is oriented parallel to the axis of the working cylinder.

In an advantageous manner, an operating arrangement for a convertible top of a vehicle with at least two working cylinders and a common pressure source is characterized in that the two working cylinders form an arrangement according to one of the above paragraphs. Especially with this use, the small structural volume and weight, as well as the simple arrangement and maintenance possibilities are of great importance.

The same advantages can be realized, of course, for operating arrangements for other movable parts of a vehicle, especially trunk doors or top flaps, coverings or the like, with at least two working cylinders and a common pressure source, where the two working cylinders form an arrangement according to one of the above paragraphs.

The invention will be better understood by reference to the accompanying drawings taken in conjunction with the following discussion.

BRIEF DESCRIPTION OF THE DRAWINGS

FIGS. 9a, 9b and 10 show perspective views and a partial cross-section of a further embodiment of a working cylinder arrangement according to the invention.

DETAILED DESCRIPTION OF THE PREFERRED EMBODIMENTS

Figure 1:
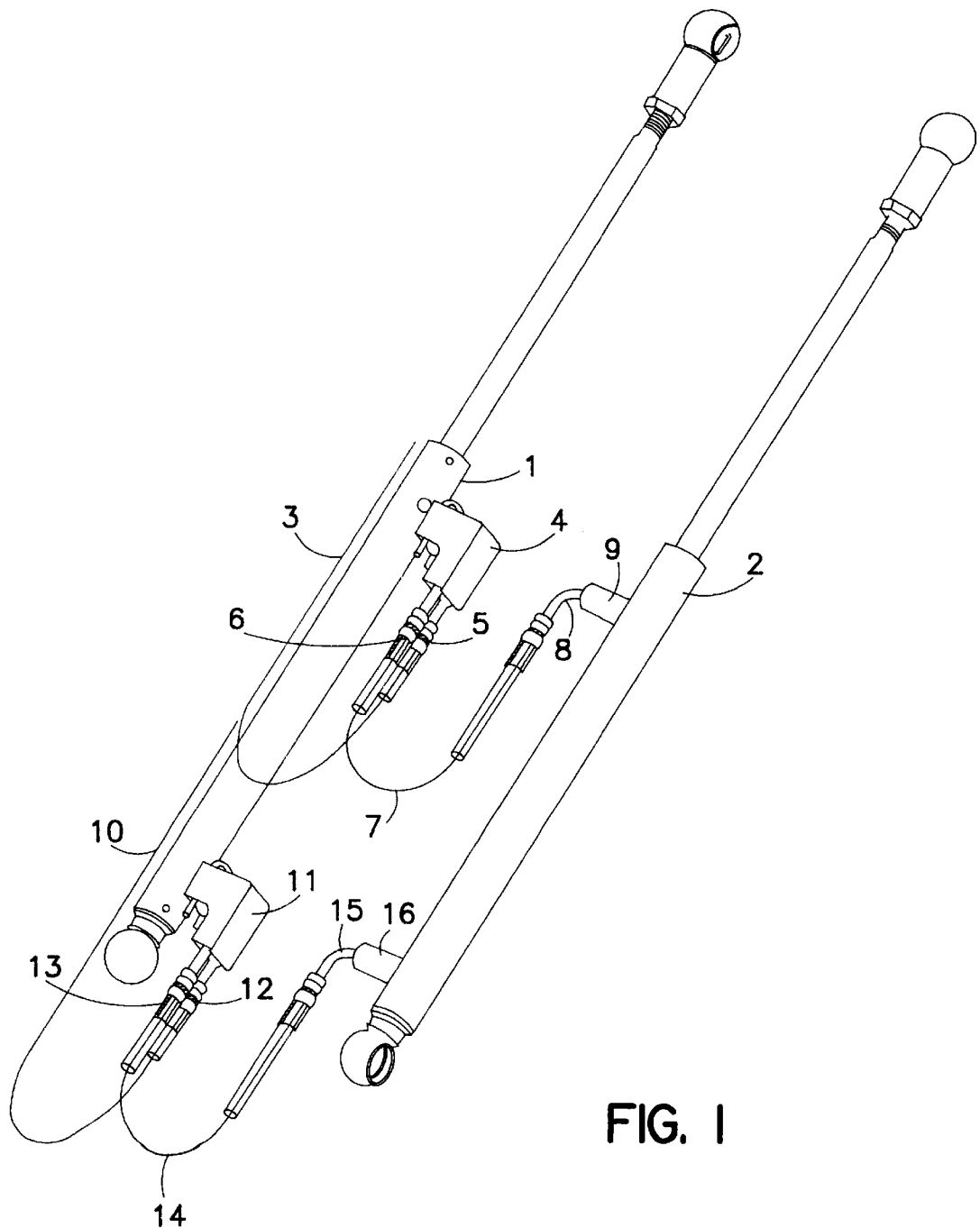
FIG. 1 shows a perspective view of an arrangement of two working cylinders that are connected with one another in a manner according to the invention.

A working cylinder assembly is shown in FIG. 1 and is seen to include parallel first and second working cylinders 1 and 2 and pressure medium supply lines for connecting the working cylinders to a common pressure source so that they are operated simultaneously. More specifically, a supply line 3 for supplying pressure medium from a source (not shown) is connected via a connection 5 to a bottom of a distributor 4, which in turn is connected to the first working cylinder 1. The distributor is connected by connection 6 to a supply line 7 which extends to a third connection 8 which is connected to a connector 9 attached to the second working cylinder 2.

In so doing, the pressure medium provided to the first working cylinder 1 via the supply line 3 is shared via a line arrangement of the connections 6 and 8 as well as supply line 7 with the second working cylinder 2, and thus simultaneous operation of both working cylinders 1, 2 using a common pressure source is achieved.

Even though the above-described connection can exist only on one cylinder end, especially single-acting working cylinders, a variation is illustrated in FIG. 1 in which the parallel switching according to the invention is provided, not only on the above-described retraction end, but also at the end of the working cylinder that effects the extension of the piston rod. Also here, the supply line 10 extends from a pressure source to distributor 11 via the connection 12. A further connection 13, supply line 14 and third connection 15 provides fluid communication to a connector 16 on the working cylinder 2 to allow for the sharing of the pressure medium of working cylinder 1 with working cylinder 2, so that both working cylinders 1, 2 are operable simultaneously via a common pressure source.

Figures 2, 3:
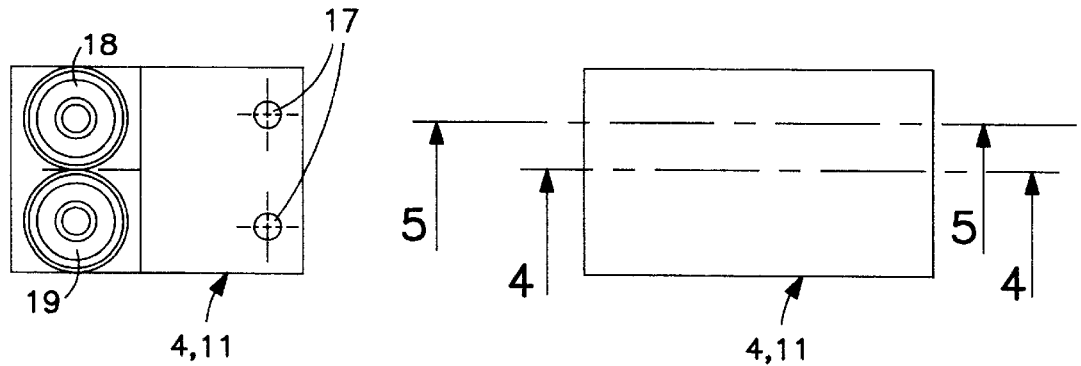
FIG. 2 shows a view of a distributor piece according to the invention from the side of the pressure supply or the pressure outlet.
FIG. 3 is a top view of the distributor piece of FIG. 2.

FIGS. 2 and 3 show a view of identical distributors 4, 11, with the connections 5, 6 or 12, 13 removed, as is always possible in the preferred embodiment. Only the drill holes 18 and 19 are visible, in which the connections 5, 6 or 12, 13 are separately placed. Holes 18 and 19 provide ports through which pressure medium may flow. Furthermore, drill holes 17 are seen in which both ends of a clamp (explained in detail in regard to FIGS. 7 and 8) are inserted.

Figures 4, 5:
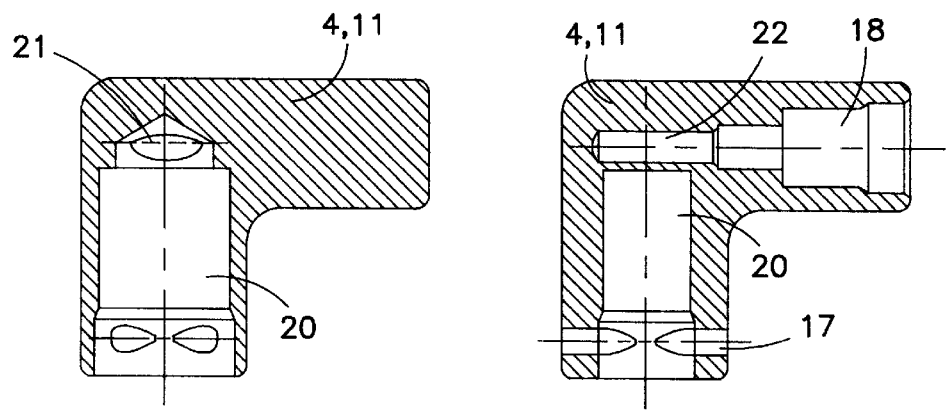
FIGS. 4 and 5 are cross-sections along the lines 4—4 and 5—5 of FIG. 3.
Figure 7:
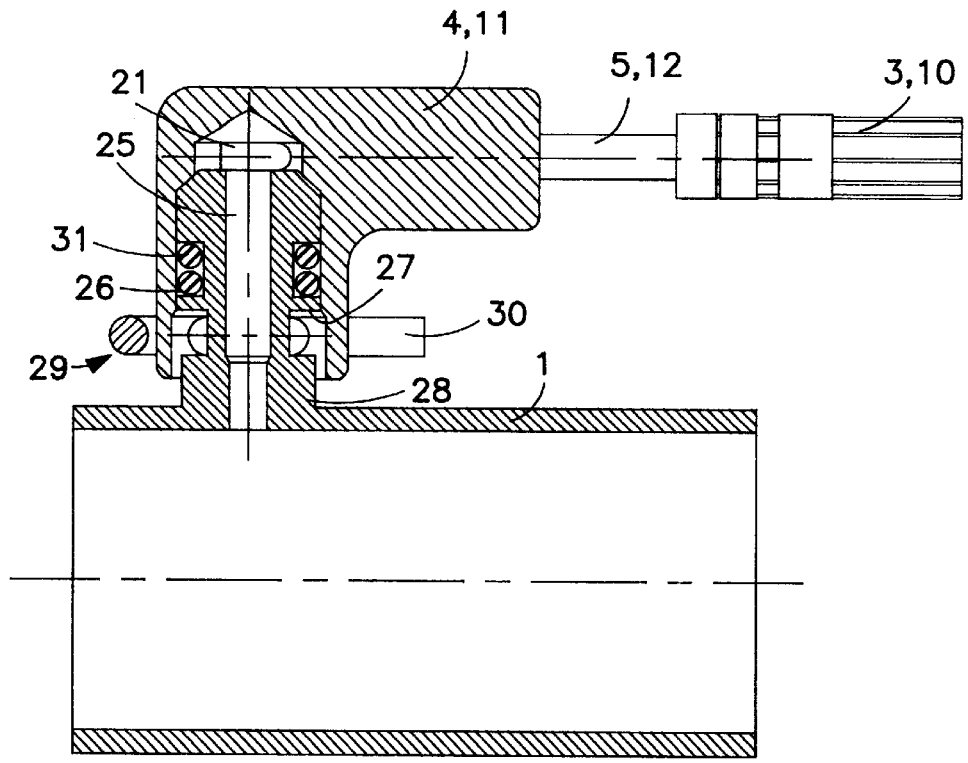
FIGS. 7 and 8 show cross-sections of the distributor piece similar to FIGS. 4 and 5 when connecting the connector of the supply line to the first working cylinder.
Figure 8:
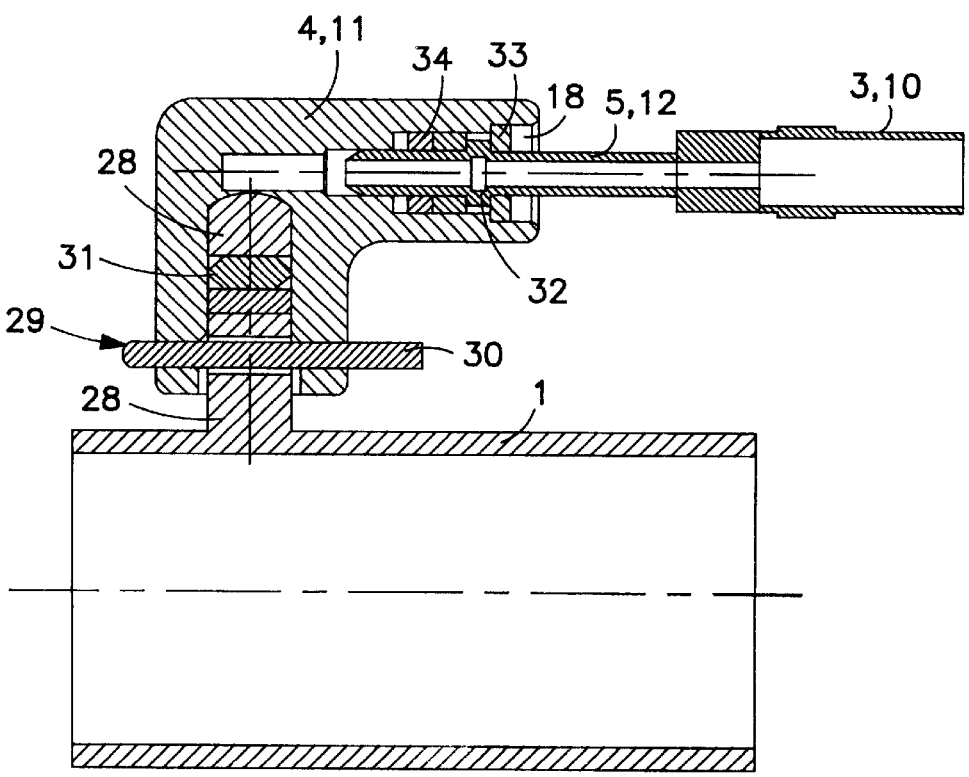

FIG. 4 shows a cross-section essentially in the middle plane of the distributor piece 4 or 11, along the line 4—4 of FIG. 3. The drill hole 20 receives the pressure medium connector 28 (as shown in FIGS. 7 and 8) when the distributor piece 4, 11 is placed on the connecter which is secured to the working cylinder. The drill hole 20 has at its upper end a cross-channel 21, as seen in FIG. 4, which connects the drill holes 18 and 19 with one another. The drill holes have axes which are parallel with one another, these axes further preferably being parallel with the longitudinal cylinder axis of cylinder 1. One of these drill holes 18 can be seen in FIG. 5 which illustrates a cross-section of the distributor piece 4, 11 along the line 5—5 of FIG. 3, for example, along the axis of the drill hole 18. It can be seen that the drill hole or port 18 has a large cross-section at its exit where the connection 5 or 12 is inserted, and its cross-section is reduced step-wise, which makes it easier to manufacture. The final section 22 of the drill hole 18 is connected with the cross-channel 21 and thus with the parallel drill hole or port 19 to also share the pressure in the drill hole 18 via this cross-channel 21 with the drill hole 19 and thence also with the parallel connected working cylinder. It is also very easy to recognize in FIG. 5 the reduced cross-section of the drill hole 20 that receives pressure medium connector 28 secured to the cylinder in the area of the round drill hole 20 which is spaced from the axis of hole 20. Of course, the drill hole 20—and thus also the pressure means connector on the cylinder—can also be of another cross-sectional shape, such as square-shaped. The lower part of the distributor piece 4, 11 has a drill hole 17 for receiving an end of the holding clamp, holes 17 intersecting hole 20 perpendicular to a plane passing through its axis, holes 17 being radially spaced from the axis of hole 20 on either side thereof.

Figure 6:
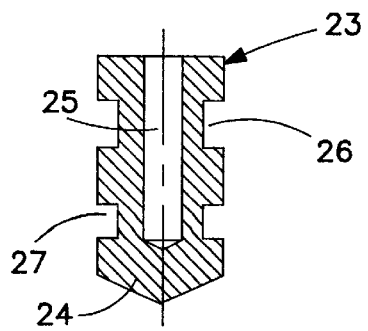
FIG. 6 shows a connector pin for welding to a cylinder pipe in a longitudinal cross-section.

FIG. 6 shows an unworked piece 23 from which the pressure medium connector is made. Piece 23 is mounted on the essentially smooth outer surface of cylinder 1 by stud welding, and in so doing, the lower conically narrowing end 24 is attached to the cylinder. Upon completion of the welding, the end of the connector is opened up to extend the drill hole 25 to provide connection to the interior of the associated working cylinder. On the outer side of the unworked piece 23, preferably two circumferential grooves (26 and 27) are made, in which (as can be seen again in FIGS. 7 and 8) in the upper groove 26, a seal 31 is placed and in the lower groove (27) the clamp ends of a clamp for the distributor piece can grip in order to fix it to the connection. Of course, the connector can be manufactured in another manner, or connected to the working cylinder in a different way.

Cross-sectional views similar to FIGS. 4 and 5 are also illustrated in FIGS. 7 and 8, in which, however, the distributor is mounted upon connector 28 and secured in place by holding clamp 29. Connector 28 has been manufactured from the unworked piece 23 shown in FIG. 6 and stud welded to the outer surface of cylinder 1. The holding clamp 29 is preferably U-shaped and its essentially parallel ends 30 are placed into the drill holes 17 of the distributor in which they simultaneously grip in the circumferential groove 27 of the connection 28. The drill holes 17 prevent the clamp ends 30 from being unintentionally dislodged sideways from the groove 27 and can even guide the clamp ends 30 into the groove 27.

The second cross-section, essentially along the line B—B of FIG. 3 (seen in FIG. 8), discloses the means for fixing the frontal section 32 of the connection 5, 12 of the supply line 3, 10 to the distributor piece 4, 11. A spring washer 33 holds connections 5, 12 in place. A seal 34 is provided around the connection. Also visible are the holding clamp 29 and one of its clamp ends 30, as well as the seal 31 in the upper circumferential groove of the connector 28. The cross-section of FIG. 8 is spaced from the axis of drill hole 25 so that the drill hole is not visible.

Of course, there are also other ways to attach the distributor piece 4, 11 to the connector 28, such as through a press fit, screwing together, a connection in the form of a bayonet lock, etc.

Figure 9A:
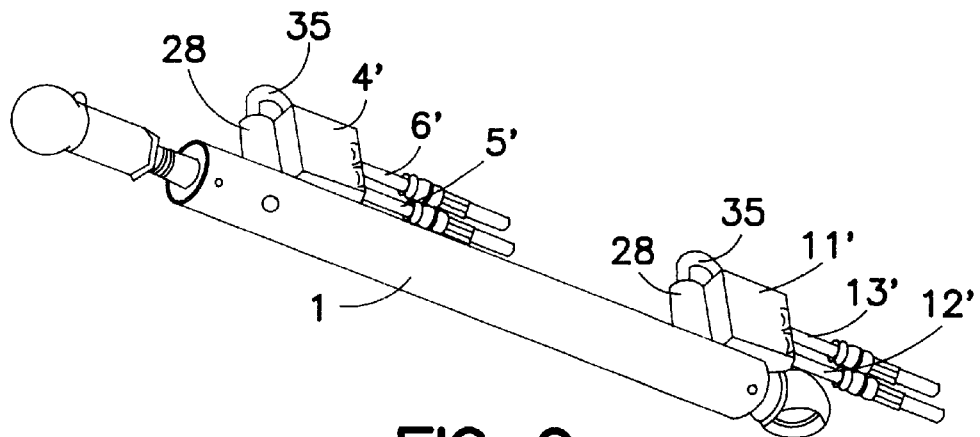
Figure 9B:
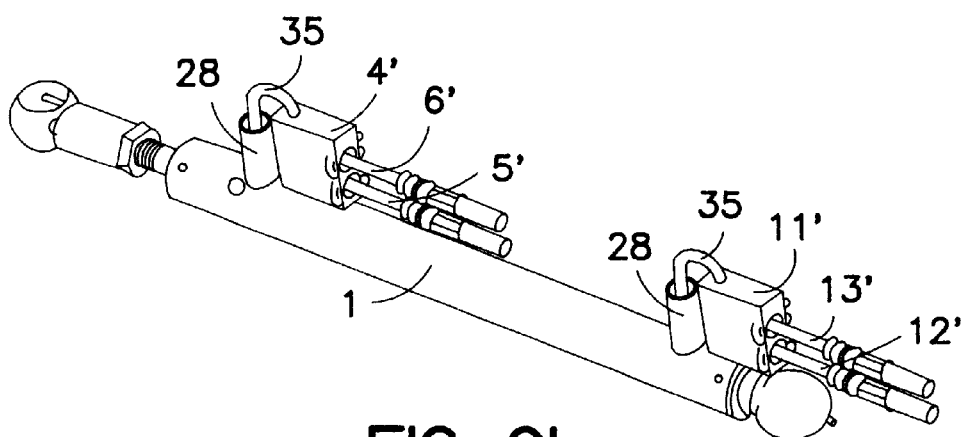

A further embodiment of a working cylinder 1 with distributors 4' and 11' is illustrated in FIGS. 9a, 9b and 10. Here, the distributor 4', 11' is not placed directly on the connector 28, but is located at a certain distance from the connector and is fixed in this position in any appropriate manner. The connections 5', 6' and 12', 13' are arranged vertically over one another instead of next to one another, as in the above-described embodiment. Both variations are basically of equal value and can be provided depending on the geometrical relationships of the distributor piece.

A flow line 35 extends from the distributor piece 4', 11' to the connector 28 and is preferably fixed therein using a spring washer, as was described above in regards to FIG. 8. In the distributor piece 4', 11' itself, the drill holes for the pressure means—in which the pressure means lines are inserted and fixed preferably also using spring washers—are connected with one another via a channel 36, from which the flow line 35 extends. Of course, in every embodiment according to the invention, any other preferably detachable securing means can be provided instead of the spring washers for the various connections. This detachable securing means can take the form of a holding clamp such as in connection with FIG. 8. The two clamp ends of an essentially U-shaped clamp can extend through drill holes in each housing connection and grip grooves formed in the final section of each line, or equivalent noses or protrusions on these sections grip one another, so that the final section is detachably secured to the housing or the connection. Permanent connections are, however, preferably created by using a press fit connection.

The invention has been described with reference to a preferred embodiment. Obviously, various modifications, alterations, and other embodiments will occur to others upon reading and understanding this specification. It is our intention to include all such modifications, alterations, and alternate embodiments insofar as they come within the scope of the appended claims, or the equivalent thereof.

I claim:

1. A working cylinder assembly which comprises first and second working cylinders and a pressure medium circulating system for causing pressure medium to flow to and from said first and second working cylinders, a pressure medium connector secured to said first working cylinder to allow pressure medium to flow to and from said first working cylinder through said connector, said pressure circulating system including a distributor detachably securable to said connector, said distributor having first and second ports through which pressure medium can flow, said second port being connected to said second working cylinder, said first port communicating through said connector with said first working cylinder and also with said second port, whereby pressure medium flowing to or from said first port also flows to or from said first working cylinder as well as to or from said second port and said second working cylinder to cause said first and second working cylinders to operate simultaneously, a holding clamp for securing said distributor on said connector, and sealing means for providing a fluid tight seal between said distributor and said connector.

2. An assembly as defined in claim 1, wherein said connector is welded to said first working cylinder.

3. An assembly as defined in claim 1, wherein said holding clamp is substantially U-shaped with two free ends, said distributor having a pair of holes formed therein receiving said ends of the clamp, said connector having groove means thereon for also receiving said fee ends of the clamp whereby the distributor is detachably secured to the connector.

4. An assembly as defined in claim 1, wherein said distributor is fixed to said first working cylinder in spaced relationship to said connector, and a flow line connecting said connector and said distributor.

5. An assembly as defined in claim 1, wherein said first port has a first axis, said second port having a second axis, said first axis being substantially parallel with said second axis.

6. An assembly as defined in claim 5, wherein said first working cylinder has a cylinder axis, said first and second axes being substantially parallel with said cylinder axis.

7. An assembly as defined in claim 1, including a vehicle having a convertible top operatively connected to said first and second working cylinders, a common source of pressure medium connected to said working cylinders, said top being moved upon simultaneous operation of said cylinders.

8. An assembly as defined in claim 1, including a vehicle having a movable part such as a trunk door, a top flap or a covering, said movable part being operatively connected to said first and second working cylinders, a common source of pressure medium connected to said cylinders, said movable part being moved upon simultaneous operation of said cylinders.

* * * * *